Nov. 29, 1955   B. E. O'CONNOR   2,724,983
TUNED HOUSING CRANKSHAFT VIBRATION DAMPERS
Filed June 13, 1950   3 Sheets-Sheet 3
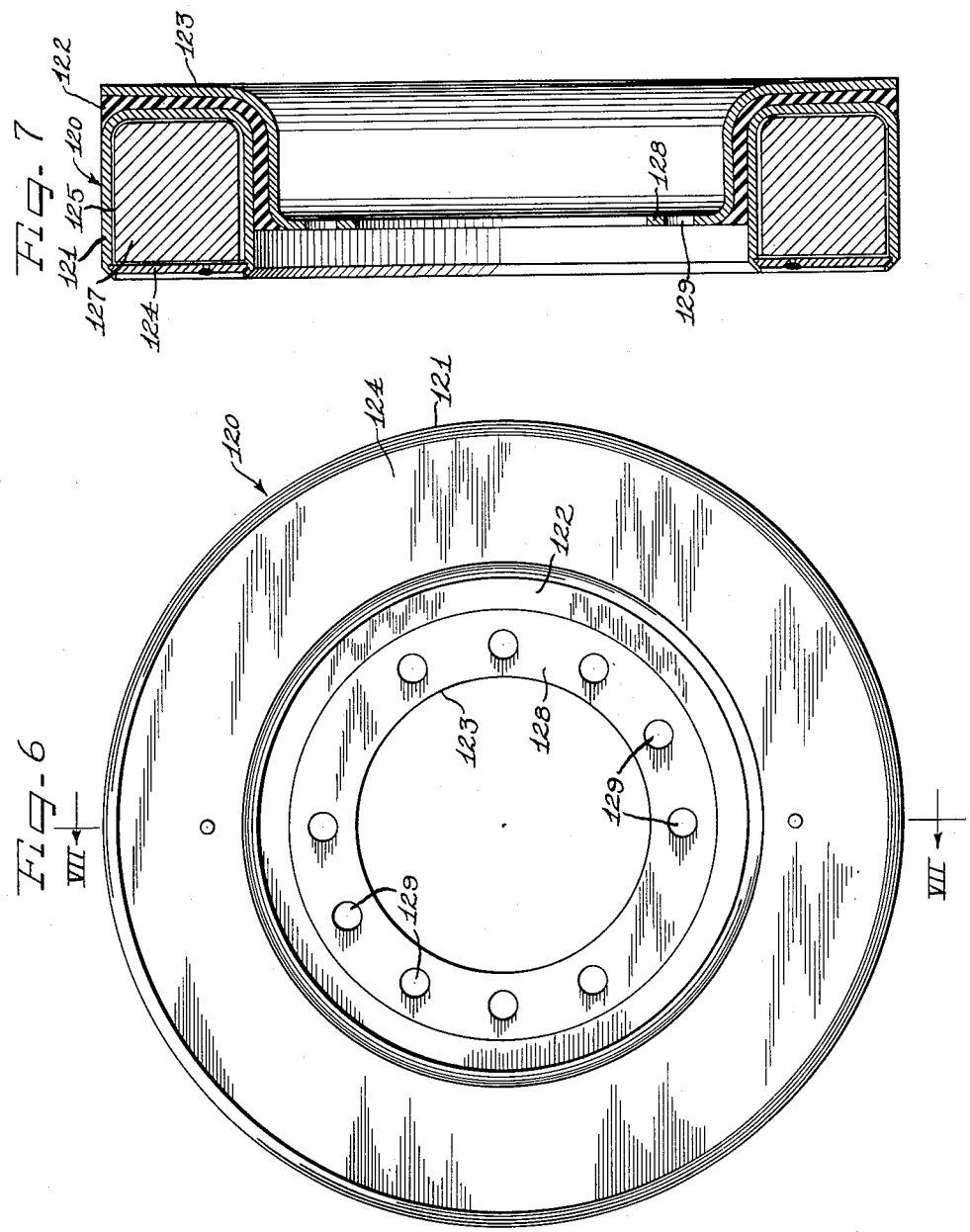
Inventor
Bernard E. O'Connor
By The Firm of Charles W. Hills Attys

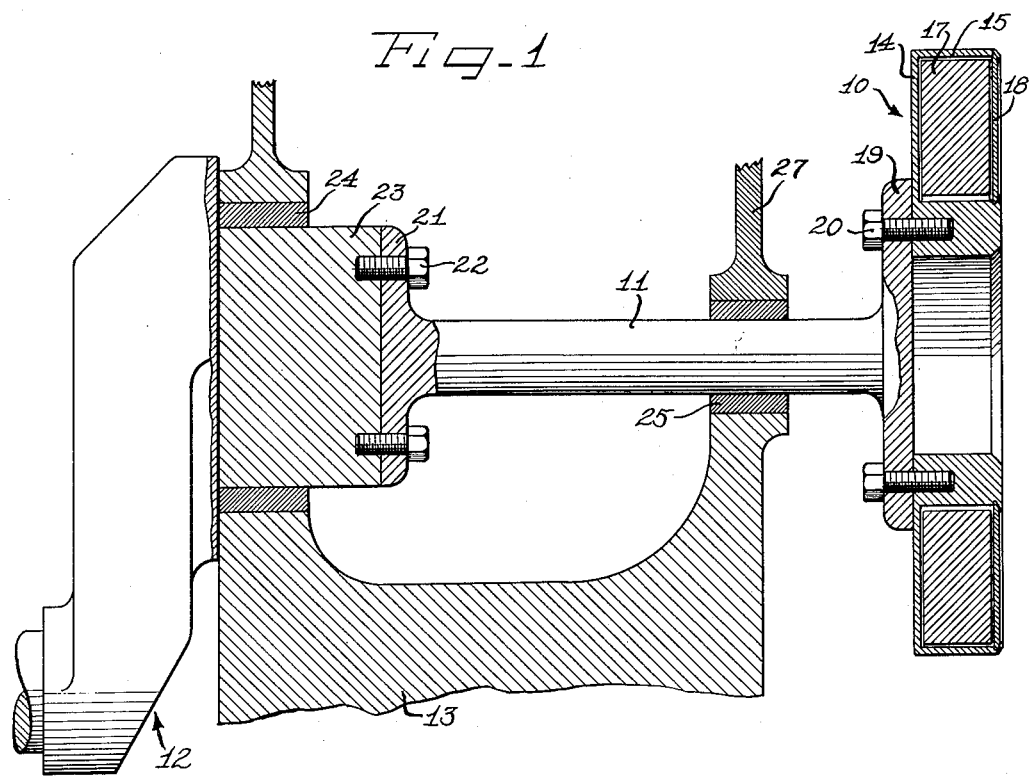
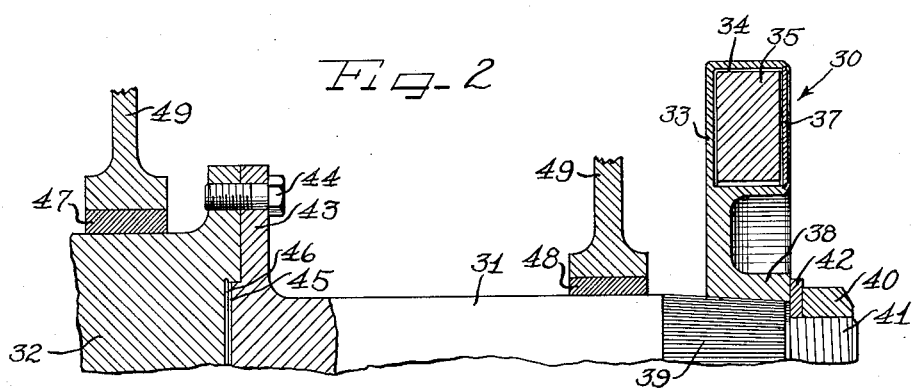

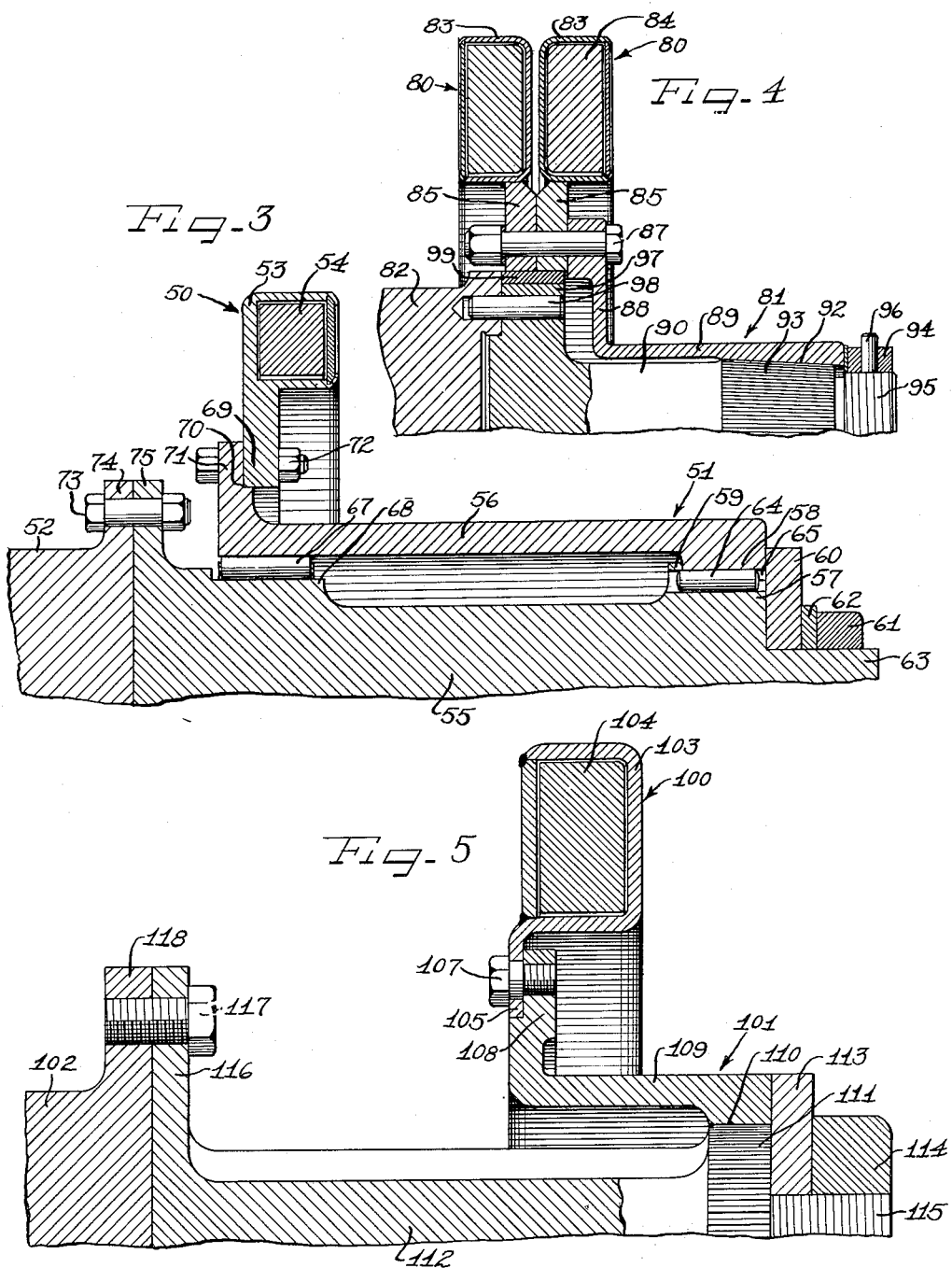

United States Patent Office 2,724,983
Patented Nov. 29, 1955

2,724,983

TUNED HOUSING CRANKSHAFT VIBRATION DAMPERS

Bernard E. O'Connor, Buffalo, N. Y., assignor to Houdaille-Hershey Corporation, Detroit, Mich., a corporation of Michigan Application June 13, 1950, Serial No. 167,850

15 Claims. (Cl. 74—574)

The present invention relates to improvements in torsional vibration dampers, and is more particularly directed to improvements in dampers which are useful in damping torsional or oscillatory vibrations in rotary or oscillating masses such as the crankshafts of rotating machinery, of which internal combustion engines are a prime example.

Torsional vibration dampers wherein an inertia mass carried by a housing is yieldably coupled with the housing have been used by having the housing secured fixedly to the rotary mass to be damped and without any possibility of relative movement between the housing and the mass to be damped. However, at some point in the operation of the rotary mass there may be a serious natural frequency vibration with which the damper cannot cope or at least cannot or does not effectively damp. It is for this problem that the present invention affords a solution.

Accordingly, it is an important object of the present invention to provide torsional vibration damping means comprising structure by which a dynamic force is introduced into the damping system to counteract vibrational natural frequencies.

Another object of the invention is to provide improved means for tuning a torsional vibration damper to counteract determinable natural frequency oscillations or vibrations in an oscillatory or rotary mass subject to torsional vibrations such as a crankshaft.

A further object of the invention is to provide a crankshaft or like torsional vibration damper capable of damping vibrations over a wide range and having means for counteracting a known natural frequency vibration that may develop in some phase of operation of the vibratory mass with which the damper is operatively associated.

Still another object of the invention is to provide a tuned housing vibration damper.

Other objects, features and advantages of the present invention will be readily apparent from the following detailed description of certain preferred embodiments thereof taken in conjunction with the accompanying drawings, in which:

Figure 1 is a more or less schematic, sectional elevational view through a fragment of machine having a crankshaft with which is utilized a novel damper structure embodying features of the present invention;

Figure 2 is a fragmentary sectional view similar to Fig. 1 but showing a modified damper construction;

Figure 3 is a fragmentary longitudinal sectional view showing a further modification;

Figure 4 is a fragmentary longitudinal sectional view showing still another damper modification;

Figure 5 is a fragmentary longitudinal sectional view through yet another modification;

Figure 6 is a face elevational view of a tuned housing vibration damper embodying a still further modification; and Figure 7 is a diametrical sectional view taken substantially on the line VII—VII of Fig. 6.

Although several forms of torsional oscillation or vibration dampers according to the present invention, and adapted for use with shafts such as crankshafts or other vibratory rotating elements of rotating machinery, have been shown and will be described hereinafter in detail, all forms have certain characteristics in common, since they are all what may be briefly designated generically as tuned housing dampers.

In each form of the damper an inertia mass is carried by a supporting structure and has a vibration damping coupling therewith. More specifically, the supporting structure comprises a housing within which the inertia mass is contained in a manner to be freely relatively torsionally movable, and the coupling comprises a viscous coupling and damping fluid. Then, and what, according to the present invention, is the most significant structure, the supporting structure or housing has spring means for connecting the same to a vibratory mass such as a crankshaft. This spring means in every instance affords a medium for tuning the damper system to counteract natural frequency vibration of undesirable magnitude at some point in the operation of the mass to be damped, by the introduction of a dynamic counteractant force.

Having reference to the form of the invention shown in Fig. 1, a typical, relatively simple tuned housing crankshaft damper installation is depicted in which the tuning spring comprises a metal spring structure. To this end, a torsional vibration damper 10 is operatively connected by means of a tuned spring 11 to a crankshaft 12 which is associated with a machine organization such as a motor including a crankcase 13.

In an efficient form the vibration damper 10 comprises a housing 14, in the present instance of annular form having therein an annular chamber 15 accommodating an inertia mass 17 and closed by a cover plate 18 which is in hermetically sealed relation to the margins of the housing or casing defining the initially open side or mouth of the chamber channel 15. The inertia mass 17 is entirely free for relative angular or rotary, axial and radial movements within the casing or housing chamber 15. However, the axially facing and peripheral surfaces of the inertia mass or flywheel ring 17 are in such relation to the opposing surfaces defining the walls of the chamber 15 that a uniform, close spacing prevails between the opposing surfaces in the operation of the damper and a viscous fluid filling the close spaces between the opposing working surfaces provides a yieldable but thoroughly resistant coupling between the inertia mass and the housing. The viscous damping fluid is preferably a silicone of appropriate viscosity.

The spacing between the opposing parallel, relative parallel movable surfaces of the inertia mass and the housing are so predetermined that the viscous damping fluid is present between the working surfaces in films which are thicker than a mere lubricating film but which are of less thickness than a layer which will produce only a fluid drag relationship. Thus, the fluid is present in shear films which are the result of an essentially linear velocity gradient spacing between the opposing parallel working surfaces of the members with relation to the viscosity of the damping fluid rather than a non-linear velocity gradient or drag relationship. The end result is that while upon the rotation of the damper 10 with uniform acceleration and at a steady rate the viscous fluid coupling causes joint rotation of the housing and inertia mass, any relative oscillatory or torsionally vibrational movements that may develop in the housing are damped by reluctance of the inertia mass to deviate from its rotary motion and the vibrational energy is absorbed and dissipated.

If the damper 10 were secured directly to the crankshaft 12 on its axis of rotation, so that the housing or casing 14 would have no relative movement with respect to the crankshaft, torsional oscillations or vibrations of the crankshaft out of phase with its rotary mode of operation would be transmitted directly to the housing and damped by the inertia mass 17 through the viscous fluid coupling, or for that matter by whatever damping coupling might be provided between the inertia mass and the housing and of which the viscous fluid coupling is an efficient, preferred example. However, at some point in the operation of the crankshaft mass 12 to be damped some such factor as the cyclic explosion rate of the engine with which the crankshaft is associated, a physical unbalance, or other causative factor may develop a natural frequency vibration with which the damper 10 by limitations of size or other reasons cannot efficiently cope. To meet this condition, the connecting spring structure 11 is so related to the damper 10 and the vibratory mass 12 and is of such predetermined resiliency that in operation it is tuned to introduce the requisite dynamic force to counteract the natural frequency oscillatory vibration in the main mass or crankshaft 12. To this end the spring member 11 comprises an elongated, preferably cylindrical torsion spring body having a head flange 19 secured as by means of a plurality of screws 20 to the hub of the damper housing 14. At its opposite or base end, the torsion spring has a base flange 21 which is secured as by means of suitable screws 22 to an axial end boss or hub 23 on the crankshaft. Although the spring unit 11 has been shown as a separately formed element attached to respectively the damper unit and the crankshaft, it may, if more convenient or expedient be formed in one piece with the housing 14, or even in one piece with the end of the crankshaft. However, in most instances separate forming of the tuning spring is preferred since the machining problems are generally less and it may be desirable to form the spring from different material than either or both of the housing and the vibratory mass to be damped. Furthermore, while the end attachment flanges on the spring have been indicated as in one piece therewith, it will be clear that either or both of the flanges may comprise separate elements appropriately secured to the body portion of the spring.

For operation, the terminal boss portion 23 of the crankshaft may be supported by an appropriate anti-friction bearing 24 mounted in the inner wall defining the frame or crankcase 13. An anti-lashing or whipping bearing 25 of suitable construction preferably rotatably supports the shank or body portion of the spring member 11 adjacent the head end thereof and is carried by an outer wall portion of the frame or crankcase 13. If preferred, the upper outer portion of the crankcase wall may comprise a removable section 27 whereby assembly of the spring 11 through the wall is facilitated.

In the operation of the form of the invention shown in Fig. 1, as torque is applied to the crankshaft 12 to drive the same rotatably, the fixedly secured spring 11 and the damper 10 connected by the spring to the crankshaft are also rotated. Vibrations in the crankshaft 12 are transmitted by the torsion spring 11 to the damper 10 and by functioning of the damper are absorbed or damped out except at the natural frequency of vibration for which the spring 11 is tuned. When this natural frequency is reached, the spring 11 itself functions between the damper at its outer end and the vibrating crankshaft at its inner end to impose a counteracting torque or torsional force dynamically opposing and counteracting the natural frequency vibration of the crankshaft and thus negativing the crankshaft vibration for which the spring is tuned. The high efficiency of this construction and relationship attains from the fact that the inertia mass 17 at all times during operation functions to resist relative torsional movements of the housing 14 and thus tends to resist torsional oscillation or vibration of the spring 11 with the crankshaft 12 and thereby imposes a torque on the spring 11 which develops the dynamic natural frequency vibration counteracting force desired.

To meet various tuning requirements, the spring 11 can be constructed of any length or diameter or torque resistance required to meet the tuning needs of particular installations or performance demands. For most requirements, the torsion spring 11 may be made from steel of suitable spring temper for adequate torsional resilience.

In the form of the invention shown in Fig. 2 a torsional vibration damper 30 is connected by means of a torsion spring 31 to the end of a rotary mass to be damped such as a crankshaft 32. The damper 30 comprises a housing 33 defining an annular channel chamber 34 within which is housed an annular inertia ring or flywheel 35. A cover plate 37 closes the chamber 34, and the relationship of the flywheel 35 to the housing 33 is in this instance the same as the relationship of the flywheel 17 to the housing 14 in the form of Fig. 1. That is, a viscous damping fluid affords an operative damping coupling between the freely movable flywheel or inertia mass at the opposing axially facing and outer peripheral surfaces of the inertia mass and the walls defining the chamber 34.

Attachment of the casing 33 to the torsion spring 31 is effected by driving an internally tapered hollow hub 38 on the housing 33 onto a complementary tapered end seat 39 on the outer end portion of the torsion spring stem, both the stem seat 39 and the internal surface of the hub 38 being preferably ribbed or serrated to retain the parts relatively non-rotatable. Axial displacement of the damper from the spring stem is prevented by a nut 40 threaded onto a reduced diameter portion 41 at the outer terminus of the spring and driving against a washer 42 bearing against the hub 38.

At its inner end the spring unit 31 may be provided with an attachment flange 43 attached by means of screws 44 to the opposing end of the crankshaft 32. In order to relieve the screws 44 from shearing stresses, the inner end of the spring member may be provided with an axial boss 45 received in a complementary socket 46 in the opposing end of the crankshaft.

Appropriate anti-friction bearings 47 and 48 rotatably support the crankshaft and the preferably cylindrical stem of the spring 31 in a machine frame or crankcase 49.

It will be observed that for some purposes the manner of assembly of the damper upon the torsion spring will afford advantages for installation purpose and sometimes for tuning purposes where different sizes of damper or spring may have to be tried out in order to effect a proper tuned relationship of the damper system to the rotary mass being damped. Functioning of the assembly of Fig. 2 is substantially the same as that described for the form of Fig. 1.

In the form of the invention shown in Fig. 3, provision is made for securing a higher degree of tuning or at least attaining greater tuning flexibility in the torsion spring structure. To this end, a tuned housing damper 50 carried by a torsion spring assembly 51 of multi-part structure is connected by the spring assembly to an oscillating or rotary mass 52 subject to vibrations to be damped. Detailed description of the damper 50 is believed unnecessary at this point since it is substantially like and functions the same as the dampers 10 and 30 already described, for this purpose comprising a casing or housing 53 having appropriate annular chamber within which is a flywheel or inertia mass ring 54 having viscous fluid coupling with the casing.

In order to multiply the torsional resilience of the spring unit 51, it is made up of a plurality of torsional spring components including a torsion spring stem 55 of mandrel-like form and a torsion spring tube 56 telescopically related about the spring stem 55. By preference both of the spring components 55 and 56 are separately formed and secured together at their outer ends.

A detachable connection between the spring components is effected by providing the spring stem 55 with an enlarged annular seat portion 57 while the outer end portion of the tubular spring member 56 is provided with an internally smaller diameter seat portion 58 complementary to and received upon the stem seat portion 57. Relative axial displacement of the telescoped spring components is prevented by a radial shoulder 59 on the seat portion 57 engaging at the inner side of the seat portion 58 of the tubular spring member, and a retaining washer plate 60 engaging against the outer extremity of the tubular spring member in opposition to the shoulder 59 and retained in place by means of a nut 61 and lock washer 62, the nut being threaded onto a reduced diameter portion 63 at the outer terminal end of the spring stem 55.

Relative torsional displacement of the attached ends of the spring components 55 and 56 is prevented by suitable means such as a suitable number of dowels 64 driven into sockets 65 formed at the interfaces of the engaging seating portions of the spring components, with part of each socket in each of the interface areas of the spring components.

Since in this instance provision is made for a relatively long tubular spring member, a bearing assembly 67 is preferably interposed between the inner or torsionally free end portion of the tubular spring member 56 and an enlarged bearing seat 68 on the spring stem 55. This enables relative torsional spring movements of the inner end portions of the spring components while preventing whip of the tubular or outer spring member 56.

Attachment of the damper unit 50 to the tubular spring component 56 is effected preferably detachably by engagement of an internal hub flange 69 on the casing 53 in a rabbet groove 70 in one face of a lateral flange 71 on the inner extremity of the tubular spring member 56 and securement of the hub flange 69 and the spring flange 71 by means such as bolts 72.

Attachment of the spring unit 51 carrying the vibration damper 50, to the rotary mass 52 to be damped, such as a crankshaft, may be effected by means such as bolts 73 securing together radially extending flanges 74 and 75 on the adjoining ends of respectively the crankshaft 52 and the spring stem 55.

It will be readily apparent that the form of the invention shown in Fig. 3 affords a construction in which greater torsional flexibility or sensitivity in the spring unit can be attained without unduly lengthening the torsion spring or making the same unduly thin for practical use in an installation where substantial transverse or shear stress or shock must be withstood in service. Yet the telescopic torsion spring structure affords an efficient tuned housing damper assembly.

In the modified form of Fig. 4, not only is provision made for multiplying the torsional resilience of the tuning spring but provision is made for the use of one or a plurality of vibration damper units in conjunction with the tuning spring unit. To this end, one or a pair of torsional vibration dampers 80 is connected by means of a torsion spring unit 81 to a torsionally oscillatable or vibrating mass 82 such as a crankshaft. Each of the dampers 80 comprises a casing 83 providing a housing defining a chamber for an annular flywheel or inertia mass 84 having viscous fluid coupling with the housing in the same manner as in the forms of damper described hereinabove. A radially inwardly extending flange 85 on each of the damper casings or housings 83 is secured as by means of bolts 87 to a radially outwardly extending attachment flange 88 on a tubular torsion spring member 89 of the spring unit 81. At its outer end the tubular spring member 89 is removably attached to a torsion spring stem 90 which the tubular member telescopes and with which nonrotary and axially non-displaceable assembly is effected by engagement of an internally serrated tapered seating portion 92 of the tubular spring engaging a complementary tapered serrated male seat portion 93 on the outer end section of the stem spring 90. A nut 94 threaded onto a reduced diameter portion 95 of the stem spring member retains the tubular spring member against axial outward displacement and is held against turning loose by means such as a pin 96.

Attachment of the vibration damper and spring assembly to the main mass 82 to be damped is effected by attaching a radial flange 97 on the inner end portion of the stem spring member to the adjacent end of the main mass 82 by means of appropriate screws (not shown) and with shear stress relieving dowels 98 alternating with the screws. Thereby torsional oscillations or vibrations are transmitted from the rotary mass 82 to the torsion spring unit 81 and thereby to the vibration dampers 80, the vibration damping functions and results being substantially like that of the other tuned housing dampers already described. However, in view of the short or stubby character of the torsional tuning spring, and possibly for other reasons as well, the multiple torsional vibration damping action of the pair of vibration dampers may be needed for optimum results. Should but a single damper 80 suffice for any particular requirements, then one of the dampers can be eliminated from the assembly.

Any tendency of the tubular torsion spring member 89 to whip is prevented by the provision of a bearing 99 between the inner peripheries defined by the flange or flanges 85 of the damper units and the opposing edge defined by the stem spring flange 97. Thereby the tubular torsion spring 89 and the stem spring 90 are adapted to have free relative torsional movement within their torsional spring limits while at the same time whipping of the tubular spring 89 due to the mass or weight of the damper units 80 is prevented.

Where only a relatively short tubular torsion spring is wanted in a compound tuning spring arrangement, the form of Fig. 5 may be used. In this form a vibration damper 100 is connected by means of a torsion spring assembly 101 to a rotary mass to be damped 102 such as a crankshaft. Here, again, the damper 100 is substantially the same in functional aspects as the dampers described hereinabove and includes a casing or housing 103 within which is operatively disposed an annular inertia mass or flywheel 104 having viscous fluid damping coupling with the housing 103.

Attachment of the housing to the tuned spring assembly 101 is effected by means of a radially inwardly extending attachment hub flange 105 on the housing which is secured as by means of screws 107 to a radial flange 108 on the inner end of a tubular torsion spring 109. Complementary tapered and serrated outer end attachment shoulders 110 and 111 on respectively the torsion spring tube 109 and a torsion spring stem 112 by their cooperation effect assembly of the spring elements. Relative axial displacement of the spring members, in addition to the taper of the cooperating attachment seats is effected by a washer member 113 secured in place by a nut 114 on a reduced diameter threaded portion 115 at the outer terminus of the spring stem 112.

Attachment of the damper and spring assembly to the main vibratory mass to be damped is effected by securement of a radial inner end flange 116 on the spring stem 112 by means of screws 117 to a flange 118 on the end of the crankshaft.

Operation of the assembly of Fig. 5 is substantially like the tuned housing, multiple torsion spring arrangements of Figs. 3 and 4, but by reason of the relatively short length of the tubular spring 109 as compared to the length of the stem spring member 112 reduces the spring effect of the tubular spring member. On the other hand, by reason of its shortness, the tubular spring member does not require any non-whipping support or buttress.

The tuned housing vibration damper assembly of Figs. 6 and 7 utilizes a torsional tuning spring of rubber or rubber-like material instead of a steel or metallic or equivalent spring. To this end there is provided a damper unit 120 including a casing or housing 121 connected by means of a rubber-like tuning spring 122 to a member 123 by which the unit is adapted to be attached to a main rotary mass in which torsional oscillations or vibrations are to be damped. In the form shown, the housing 121 comprises a generally channel-shaped annular sideward opening member with the opening thereto closed by an annular cover plate 124 the edges of which are in hermetically sealed relation to the outer margins of the housing member. This provides an annular closed chamber 125 within which is an annular inertia mass or flywheel ring 127, the axially facing and outer peripheral surfaces of which are in shear film spaced relation to the opposing surfaces of the housing so that a viscous damping fluid within the chamber 125 affords a yieldable damping coupling between the inertia mass and the housing.

A fixed attachment of the housing 121 to the rubber-like tuning spring 122 is effected in any appropriate manner as by bonding or otherwise so that a non-releasable attachment prevails over a substantial area of both the housing and the spring unit, herein shown as comprising substantially all of two angularly related outer walls namely the inner peripheral wall and a side wall of the housing.

Attachment of the attaching member 123 to the spring unit 122 is also effected to be permanent and non-releasable as by bonding or otherwise. The attached relation is extended over a substantial area by providing the member 123 with an area substantially co-extensive with the area of the rubber-like spring 122 in its attached relation to the housing 121, the form of the member 123 being therefore preferably substantially complementary to the opposing surfaces of the housing 121, but in spaced relation to accommodate the rubber-like spring 122 therebetween. In this manner it is possible to have a large area rubber-like tuning spring with but a relatively small volume in the rubber-like spring whereby to provide a very compact unit.

Attachment of the tuned housing damper unit 120 to a rotary mass to be damped, is adapted to be effected by means of appropriate fasteners such as bolts or screws (not shown) applied to and through a radially inwardly extending attachment flange 128 on the member 123 and having suitable bolt holes 129 therein.

In operation, the attachment member 123 will be fixedly secured to the rotary mass to be damped and will thus be subjected to the vibrations encountered in the main rotary mass. By way of the resilient tuning spring 122 the housing 121 will be coupled through the attachment member 123 to the main mass to be damped and the inertia mass 127 operating through the viscous damping fluid in the housing 121 will dampen the vibrations in the mass to be damped, with the tuning spring 122 acting to introduce the dynamic force to counteract a natural frequency vibration in the main mass. Thus the damper unit 120 functions substantially like the tuned housing damper units described hereinabove.

It will be understood that modifications and variations may be effected without departing from the scope of the novel concepts of the present invention.

I claim as my invention:

1. In combination, a crankshaft, a vibration damper comprising a housing enclosure and an inertia mass within said enclosure and having a vibration damping coupling therewith, and metallic spring means fixedly engaging the housing and connecting the housing to an end of the crankshaft for relative operative movement with respect to the shaft.

2. In combination, a crankshaft, a vibration damper comprising a housing and an inertia mass having a vibration damping coupling with the housing, and metallic spring means fixedly engaging the housing and connecting the housing for rotation with the crankshaft, said metallic spring means being the sole operative connection with the crankshaft and being tuned to a high frequency vibration of the crankshaft.

3. In combination, a crankshaft, a vibration damper comprising a housing and an inertia mass carried by the housing and having a vibration damping coupling therewith, and a metallic torsion spring fixedly engaging the housing and connecting the housing to one end of the crankshaft on the axis of rotation of the crankshaft and compelling rotation of the housing with the crankshaft, said metallic spring being the sole operative connection with the crankshaft and being tuned to a natural frequency vibration of the crankshaft.

4. In combination, a crankshaft, a vibration damper comprising a housing and an inertia mass carried by the housing and having a vibration damping coupling therewith, and a torsion spring connecting the housing to one end of the crankshaft on the axis of rotation of the crankshaft and compelling rotation of the housing with the crankshaft, said spring being tuned to a natural frequency vibration of the crankshaft, said torsion spring comprising an elongated torsion spring stem supporting the housing for oscillatory movement relative to the crankshaft.

5. In combination, a crankshaft, a vibration damper comprising a housing and an inertia mass carried by the housing and having a vibration damping coupling therewith, and a torsion spring connecting the housing to the crankshaft on the axis of rotation of the crankshaft and compelling rotation of the housing with the crankshaft, said spring being tuned to a natural frequency vibration of the crankshaft, said torsion spring comprising a stem member and a torsion tube member operatively interconnected.

6. A tuned housing damper comprising, in combination, a housing, an inertia mass carried by the housing and having a vibration damping coupling therewith, and a torsion spring comprising telescoped torsion spring members connected together for joint and relative torsional spring action, the radially outer of said torsion spring members being attached to said housing and the radially inner of said torsion spring members being adapted to be connected to a vibratory mass to be damped.

7. A tuned housing damper comprising, in combination, a housing, an inertia mass carried by the housing and having a vibration damping coupling therewith, and a torsion spring assembly comprising telescopically related torsion spring members one of which is connected to the housing and the other of which is adapted to be connected to a vibratory mass to be damped.

8. A tuned housing torsional vibration damper comprising a housing, an inertia mass carried by the housing and having a vibration damping coupling therewith, and spring means for connecting the housing for torsional movement with a torsionally movable vibratory mass to be damped, said spring means comprising a solid torsion spring stem and a tubular torsion spring telescoped about the stem with the head end portions of the springs fixedly secured together, the tubular spring having a base end portion attached to the housing and the stem spring having a base end portion projecting beyond the base end portion of the tubular spring and adapted to be secured to the mass to be damped.

9. A tuned housing torsional vibration damper comprising a housing, an inertia mass carried by the housing and having a vibration damping coupling therewith, and spring means for connecting the housing for torsional movement with a torsionally movable vibratory mass to be damped, said spring means including telescopically related torsion spring members the outer of which is a tubular spring and is attached at one end to the inner of the spring members with an anti-friction bearing connection between the remaining end portion of the tubular spring member and the inner spring member.

10. In combination in a torsional spring unit for attaching a vibration damper to a vibratory mass to be damped, an elongated torsion spring member, a tubular torsion spring member, said tubular torsion spring member being telescoped over the elongated torsion spring member, means connecting contiguous end portions of the spring members, the opposite ends of said spring members having respective radially extending flanges for attachment to respectively the vibratory mass and the vibration damper.

11. In combination, a crankshaft, means rotatably supporting said crankshaft, an elongated torsion spring member coaxially connected to one end of the crankshaft and projecting axially therefrom for rotation therewith on the axis of rotation of the crankshaft, an inertia mass carried by the end of said spring member remote from the end of the crankshaft, and bearing means including a stationary support structure rotatably supporting said spring member intermediate its ends.

12. In combination, a rotary member subject to torsional vibrations and having an end, an elongated torsion spring member secured at one of its ends concentrically to said end of said rotary member, a support structure of substantially greater diameter than said torsion spring member supported concentrically at the opposite end of said torsion spring member, and a rotary inertia member flexibly coupled to and supported by said support structure concentrically with the axis of the rotary member, said torsion spring member being tuned to a predetermined vibration frequency of said rotary member while said inertia mass has general vibration damping effect upon the rotary member through the medium of said torsion spring and said support structure.

13. A combination as defined in claim 12, additionally including a bearing structure rotatably supporting said elongated torsion spring.

14. A combination as defined in claim 12, wherein said torsion spring member comprises a torsion tube, and a concentrically interconnected torsion rod comprises means for securing the end of the torsion tube remote from the support structure to said end of the rotary member subject to vibrations.

15. A combination as defined in claim 14, wherein the tube and rod are in telescoped relation and except for said interconnection are relatively oscillatable, and bearing structure is interposed between the tube and the rod spaced from the interconnection.

References Cited in the file of this patent

UNITED STATES PATENTS

| | | |
|---|---|---|
| 1,636,262 | Troendly | July 19, 1927 |
| 1,847,181 | Harrison | Mar. 1, 1932 |
| 1,961,679 | Walti | June 5, 1934 |
| 1,965,742 | Junkers | July 10, 1934 |
| 2,369,679 | Matteucci | Feb. 20, 1945 |
| 2,454,980 | Sobell | Nov. 30, 1948 |
| 2,514,139 | O'Connor | July 4, 1950 |
| 2,585,382 | Guernsey | Feb. 12, 1952 |

FOREIGN PATENTS

| | | |
|---|---|---|
| 298,043 | Germany | June 11, 1915 |
| 434,355 | Great Britain | Aug. 29, 1935 |
| 123,214 | Sweden | Nov. 9, 1948 |